United States Patent
Li et al.

(10) Patent No.: US 10,523,129 B2
(45) Date of Patent: Dec. 31, 2019

(54) SYNCHRONOUS RECTIFICATION CIRCUIT

(71) Applicant: GUIZHOU E-CHIP MICROELECTRONICS TECHNOLOGY CO., LTD., Guiyang (CN)

(72) Inventors: Zehong Li, Guiyang (CN); Rong Wang, Guiyang (CN); Caimin Yi, Guiyang (CN); Yuzhou Wu, Guiyang (CN)

(73) Assignee: Guizhou E-CHIP Microelectronics Technology Co., Ltd., Guizhou (CN)

( * ) Notice: Subject to any disclaimer, the term of this patent is extended or adjusted under 35 U.S.C. 154(b) by 0 days.

(21) Appl. No.: 16/374,712

(22) Filed: Apr. 3, 2019

(65) Prior Publication Data
US 2019/0229642 A1 Jul. 25, 2019

Related U.S. Application Data

(63) Continuation of application No. PCT/CN2017/081385, filed on Apr. 21, 2017.

(30) Foreign Application Priority Data

Nov. 18, 2016 (CN) .......................... 2016 1 1015760

(51) Int. Cl.
*H02M 7/217* (2006.01)
*H02M 1/08* (2006.01)
*H02M 3/07* (2006.01)

(52) U.S. Cl.
CPC ............. *H02M 7/217* (2013.01); *H02M 1/08* (2013.01); *H02M 3/07* (2013.01)

(58) Field of Classification Search
CPC ............ H02M 7/21; H02M 7/12; H02M 7/02; H02M 7/217; H02M 1/08; H02M 3/07;
(Continued)

(56) References Cited

U.S. PATENT DOCUMENTS 6,975,521 B1 12/2005 Konno
2006/0006850 A1* 1/2006 Inoue ................... H02J 7/0065
323/265
(Continued)

FOREIGN PATENT DOCUMENTS

CN 1333592 A 1/2002
CN 103475221 A 12/2013
(Continued)

OTHER PUBLICATIONS

The International Search Report of corresponding International application No. PCT/CN2017/081385, dated Aug. 23, 2017.
(Continued)

*Primary Examiner* — Adolf D Berhane
(74) *Attorney, Agent, or Firm* — J.C. Patents

(57) ABSTRACT

Provided is a synchronous rectification circuit, which relates to electronic circuit technologies. The synchronous rectification circuit is self-driven by a combination of a charge pump and a Boost circuit, including a rectification MOSFET, a charge pump, logic control modules, voltage detection modules, an oscillator module, a PWM generation module, a reference voltage generation module, a switch, a free-wheeling MOSFET, an isolation MOSFET, an inductor, a capacitor and sampling resistors. According to the present application, initially, the charge is stored on the capacitor through the charge pump, the Boost circuit is turned on till the voltage is increased to a certain value; through processing by the logic control modules and the like, the rectification MOSFET is turned on, thus self-driving of the synchronous rectification circuit is achieved. The self-driving mode can charge the capacitor faster, lower the duty of the rectification circuit, and reduce the average conduction voltage drop.

4 Claims, 1 Drawing Sheet

(58) Field of Classification Search
CPC .......... H02M 3/073; H02M 2003/075; H02M 2003/076; H02M 2003/077
See application file for complete search history.

(56) References Cited

U.S. PATENT DOCUMENTS

| | | | | |
|---|---|---|---|---|
| 2006/0113922 A1* | 6/2006 | Ribarich | ............ | H05B 41/2882 315/209 R |
| 2009/0010035 A1* | 1/2009 | Williams | .............. | H02M 3/158 363/131 |
| 2010/0045251 A1* | 2/2010 | Murota | ................. | H02M 3/158 323/282 |
| 2015/0035512 A1* | 2/2015 | Kim | ...................... | H02M 3/073 323/300 |
| 2015/0062972 A1* | 3/2015 | Yang | ................. | H02M 3/33592 363/21.01 |

FOREIGN PATENT DOCUMENTS

| | | |
|---|---|---|
| CN | 104578772 A | 4/2015 |
| CN | 104796015 A | 7/2015 |
| CN | 105929122 A | 9/2016 |
| CN | 106374739 A | 2/2017 |
| CN | 206226279 U | 6/2017 |

OTHER PUBLICATIONS

The Chinese First Examination Report, including the Search Report of corresponding Chinese application No. 201611015760.5, dated Dec. 4, 2017.

\* cited by examiner

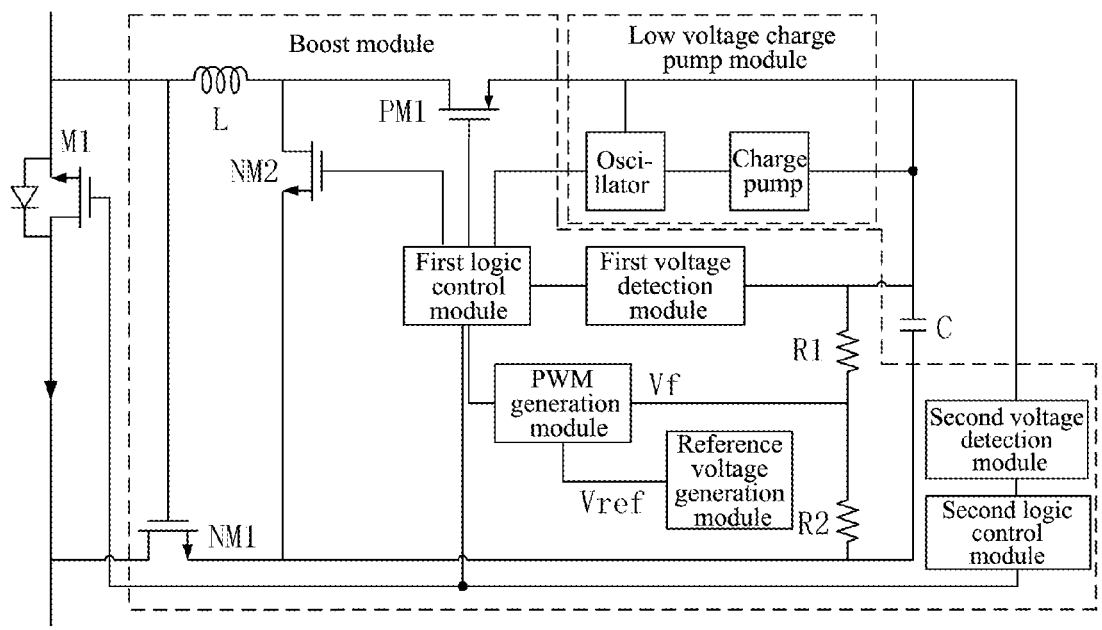

SYNCHRONOUS RECTIFICATION CIRCUIT

CROSS-REFERENCE TO RELATED APPLICATIONS

This application is a continuation of International Application No. PCT/CN2017/081385, filed on Apr. 21, 2017, which claims priority to Chinese Patent Application No. 201611015760.5, filed on Nov. 18, 2016, both of which are hereby incorporated by reference in their entireties.

TECHNICAL FIELD

The present application relates to electronic circuit technologies and, in particular, to a synchronous rectification circuit.

BACKGROUND

Technologies of synchronous rectification (SR) use a low-voltage power metal-oxide-semiconductor field-effect transistor (MOSFET) as a rectifier. With its low forward voltage drop and small on-state resistance, the overall power consumption of the rectification module may be reduced. The main difficulty in using the technologies of synchronous rectification lies in gate control of its rectification MOSFET.

The rectification MOSFET is mainly driven in a pulse width modulation (PWM) mode, which is complicated to be implemented and needs to establish a space vector mathematical model to perform a complex transformation solution. A great number of logic processing is required in circuit construction, and thus technical difficulties and costs are increased. Application of an external power supply driving mode is relatively complicated, whereas an independent charge pump self-driving mode has a slow charging speed, which is disadvantageous to popularization and application of the technologies of synchronous rectification.

SUMMARY

The present application provides a synchronous rectification circuit, including: a low voltage charge pump module, a Boost module, an external capacitor C and a rectification MOSFET M1; where the low voltage charge pump module is composed of an oscillator and a charge pump; the Boost module is composed of a first logic control module, a second logic control module, a first voltage detection module, a second voltage detection module, a PWM generation module, a reference voltage generation module, a switch PM1, a free-wheeling MOSFET NM2, an isolation MOSFET NM1, an inductor L and sampling resistors R1 and R2; where the isolation MOSFET NM1 has its drain connected to the drain of the rectification MOSFET M1, its source connected to the source of the free-wheeling MOSFET NM2, a lower end of the sampling resistor R2 and a lower plate of the external capacitor C, and its gate connected to the source of the rectification MOSFET M1 and one end of the inductor L; the switch PM1 has its source connected to the oscillator, an upper plate of the external capacitor C and an input of the second voltage detection module, its drain connected to the other end of the inductor L and the drain of the free-wheeling MOSFET NM2; the external capacitor C has its upper plate connected to the input of the first voltage detection module and an output of the charge pump; the charge pump has its input connected to the oscillator; the sampling resistors R1 and R2 are connected in series, a common connection end of the sampling resistors R1 and R2 is connected to an input of the PWM generation module, the other end of the sampling resistor R1 is connected to the input of the first voltage detection module and the upper plate of the external capacitor C, the other end of the sampling resistor R2 is connected to the lower plate of the external capacitor C, a voltage Vf generated after voltage-dividing of the sampling resistors R1 and R2 in series and a voltage Vref generated by the reference voltage generation module serve as the input of the PWM generation module; the first logic control module has its first input connected to an output of the first voltage detection module, its second input connected to an output of the PWM generation module, and its third input connected to an output of the second logic control module; the first logic control module has its first output connected to the gate of the free-wheeling MOSFET NM2, its second output connected to the gate of the switch PM1, and its third output connected to the oscillator; the second voltage detection module has its input connected to the upper plate of the external capacitor C and its output connected to an input of the second logic control module; and the second logic control module has its output connected to the gate of the rectification MOSFET M1.

Further, the first logic control module controls the switching of the switch PM1 and the free-wheeling MOSFET NM2 of the Boost module, and the second logic control module controls the switching of the rectification MOSFET M1.

Further, the switch PM1 is a P-type MOSFET or a PNP bipolar transistor; the free-wheeling MOSFET NM2 is an N-type MOSFET or an NPN bipolar transistor.

Further, the rectification MOSFET M1 is a Vertical double-diffusion Metal-oxide-semiconductor (VDMOS) or a Lateral double-diffusion Metal-oxide-semiconductor (LDMOS).

The present application provides a synchronous rectification circuit. The logic control modules are used to control operations of the oscillator, the free-wheeling MOSFET, the switch and the rectification MOSFET; the oscillator is used to control operations of the charge pump; the charge pump is used to charge the capacitor, and the capacitor provides gate driving for the rectification MOSFET via the logic control modules. By using a self-driving mode combining a low-voltage charge pump with a Boost module, an additional external power supply is not required, meanwhile the speed of charging the capacitor is accelerated, the duty ratio of the rectification circuit is reduced, and the average conduction voltage drop is reduced, thereby greatly reducing the application complexity and improving the application range.

BRIEF DESCRIPTION OF DRAWINGS

FIG. 1 is a structure view of a synchronous rectification circuit according to an embodiment of the present application.

DESCRIPTION OF EMBODIMENTS

Technical solutions in embodiments of the present application will be described hereunder clearly and completely with reference to the accompanying drawing. Obviously, the described embodiments are only a part of embodiments of the present application, rather than all of them. Based on the embodiments in the present application, all other embodiments obtained by persons of ordinary skill in the art without any creative effort should fall into the protection scope of the present application.

FIG. 1 is a structure view of a synchronous rectification circuit according to an embodiment of the present application. As shown in FIG. 1, the synchronous rectification circuit includes a low voltage charge pump module, a Boost module, an external capacitor C and a rectification MOSFET M1.

The low voltage charge pump module is composed of an oscillator and a charge pump.

The Boost module is composed of a first logic control module, a second logic control module, a first voltage detection module, a second voltage detection module, a PWM generation module, a reference voltage generation module, a switch PM1, a free-wheeling MOSFET NM2, an isolation MOSFET NM1, an inductor L and sampling resistors R1 and R2.

The isolation MOSFET NM1 has its drain connected to the drain of the rectification MOSFET M1, its source connected to the source of the free-wheeling MOSFET NM2, the lower end of the sampling resistor R2 and the lower plate of the external capacitor C, and its gate connected to the source of the rectification MOSFET M1 and one end of the inductor L; the switch PM1 has its source connected to the oscillator, the upper plate of the external capacitor C and the input of the second voltage detection module, its drain connected to the other end of the inductor L and the drain of the free-wheeling MOSFET NM2.

The external capacitor C has its upper plate connected to the input of the first voltage detection module and the output of the charge pump.

The charge pump has its input connected to the oscillator.

The sampling resistors R1 and R2 are connected in series, their common connection end is connected to the input of the PWM generation module, the other end of the sampling resistors R1 is connected to the input of the first voltage detection module and the upper plate of the external capacitor C, the other end of the sampling resistor R2 is connected to the lower plate of the external capacitor C, the voltage Vf generated after voltage-dividing of the sampling resistors R1 and R2 in series and the voltage Vref generated by the reference voltage generation module serve as the inputs of the PWM generation module.

The first logic control module has its first input connected to the output of the first voltage detection module, its second input connected to the output of the PWM generation module, and its third input connected to the output of the second logic control module.

The first logic control module has its first output connected to the gate of the free-wheeling MOSFET NM2, its second output connected to the gate of the switch PM1, and its third output connected to the oscillator.

The second voltage detection module has its input connected to the upper plate of the external capacitor C and its output connected to the input of the second logic control module; and the second logic control module has its output connected to the gate of the rectification MOSFET M1.

The synchronous rectification circuit in the present embodiment uses a charge pump and Boost techniques instead of the conventional PWM driving mode. By using the self-driving mode combining a low-voltage charge pump with a Boost module, an additional external power supply is not required, meanwhile the speed of charging the capacitor the capacitor is accelerated, the duty ratio of the rectification circuit is reduced, and the average conduction voltage drop is reduced, thereby greatly reducing application complexity and improving application range.

The present technical solution includes the rectification MOSFET M1, the charge pump, the logic control module, the voltage detection module, the oscillator, the PWM generation module, the reference voltage generation module, the switch PM1, the free-wheeling MOSFET NM2, the rectification MOSFET M1, the inductor L, the external capacitor C and the sampling resistors R1 and R2. The first logic control module controls the switching of the switch PM1 and the free-wheeling MOSFET NM2 of the Boost module, and the second logic control module controls the switching of the rectification MOSFET M1.

The operating process is as follows:

(1) When the reverse body diode of the rectification MOSFET M1 is turned on, the low voltage charge pump is turned on, the voltage over the external capacitor C is 0, the charge pump, driven by the oscillator, enables the voltage over the external capacitor C to be gradually increased for a low-voltage startup, and a working time at this stage is set to T1.

(2) When the voltage over the external capacitor C reaches operating conditions of the Boost module, the first voltage detection module outputs a control signal, the low voltage charge pump module is turned off, meanwhile the Boost module is turned on, the voltage over the external capacitor C continues to be boosted, the second voltage detection module detects the voltage over the external capacitor C; when the voltage over the external capacitor C reaches the preset upper limit VH, the second logic control module turns on the rectification MOSFET M1, meanwhile the Boost module is turned off, and charging of the external capacitor C is stopped. A working time at this stage is set to T2.

(3) At this stage, the Boost module and the low voltage charge pump module are turned off, energy of the external capacitor C maintains the rectification MOSFET M1 to be turned on, meanwhile the second voltage detection module detects the voltage over the external capacitor C; when the voltage over the external capacitor C is decreased to the preset lower limit VL, the second logic control module turns off the rectification MOSFET M1, the low voltage charge pump module is then turned on and the external capacitor C continues to be charged and the voltage thereof is boosted. A working time at this stage is set to T3.

(4) The above process is repeated cyclically, and a square wave having a duty ratio of m is formed between the source S and the drain D of the rectification MOSFET M1.

When the current flows through the body diode of the rectification MOSFET M1, the voltage between the source S and the drain D of the rectification MOSFET M1 is set to VF, and then the average voltage is:

$$Vm = \frac{T1+T2}{T1+T2+T3} * VF.$$

It should be noted that devices in the present embodiment may be different types of devices in specific implementations, which is not limited in this present embodiment. Alternatively, the switch PM1 may be a P-type MOSFET or a PNP bipolar transistor; the free-wheeling MOSFET NM2 may be an N-type MOSFET or an NPN bipolar transistor. Alternatively, the rectification MOSFET M1 may be a VDMOS or an LDMOS.

In summary, the synchronous rectification circuit in the present embodiment uses a self-driving mode combining a low-voltage charge pump with a Boost module, an additional external power supply is not required, meanwhile the speed of charging the capacitor is accelerated, the duty ratio of the rectification circuit is reduced, and the average conduction voltage drop is reduced, thereby greatly reducing application complexity and improving application range.

Persons of ordinary skill in the art may understand that, all or a part of the steps of the foregoing method embodiments may be implemented by program instruction relevant hardware. The foregoing program may be stored in a computer readable storage medium. When the program runs, the steps of the foregoing method embodiments are performed. The foregoing storage medium includes various mediums capable of storing program codes, such as a read only memory (ROM), a random access memory (RAM), a magnetic disk or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some or all technical features thereof; however, these modifications or replacements do not make the essence of corresponding technical solutions depart from the scope of the technical solutions in the embodiments of the present application.

What is claimed is:

1. A synchronous rectification circuit, comprising: a low voltage charge pump module, a Boost module, an external capacitor C and a rectification metal-oxide-semiconductor field-effect transistor (MOSFET) M1;
    wherein the low voltage charge pump module is composed of an oscillator and a charge pump;
    the Boost module is composed of a first logic control module, a second logic control module, a first voltage detection module, a second voltage detection module, a pulse width modulation (PWM) generation module, a reference voltage generation module, a switch PM1, a free-wheeling MOSFET NM2, an isolation MOSFET NM1, an inductor L and sampling resistors R1 and R2;
    wherein the isolation MOSFET NM1 has its drain connected to the drain of the rectification MOSFET M1, its source connected to the source of the free-wheeling MOSFET NM2, a lower end of the sampling resistor R2 and a lower plate of the external capacitor C, and its gate connected to the source of the rectification MOSFET M1 and one end of the inductor L; the switch PM1 has its source connected to the oscillator, an upper plate of the external capacitor C and an input of the second voltage detection module, its drain connected to the other end of the inductor L and the drain of the free-wheeling MOSFET NM2;
    the external capacitor C has its upper plate connected to an input of the first voltage detection module and an output of the charge pump;
    the charge pump has its input connected to the oscillator;
    the sampling resistors R1 and R2 are connected in series, a common connection end of the sampling resistors R1 and R2 is connected to an input of the PWM generation module, the other end of the sampling resistor R1 is connected to the input of the first voltage detection module and the upper plate of the external capacitor C, the other end of the sampling resistor R2 is connected to the lower plate of the external capacitor C, a voltage Vf generated after voltage-dividing of the sampling resistors R1 and R2 in series and a voltage Vref generated by the reference voltage generation module serve as the input of the PWM generation module;
    the first logic control module has its first input connected to an output of the first voltage detection module, its second input connected to an output of the PWM generation module, and its third input connected to an output of the second logic control module;
    the first logic control module has its first output connected to the gate of free-wheeling MOSFET NM2, its second output connected to the gate of the switch PM1, and its third output connected to the oscillator;
    the second voltage detection module has its input connected to the upper plate of the external capacitor C and its output connected to an input of the second logic control module; and the second logic control module has its output connected to the gate of the rectification MOSFET M1.

2. The synchronous rectification circuit according to claim 1,
    wherein the first logic control module controls switching of the switch PM1 and the free-wheeling MOSFET NM2 of the Boost module, and the second logic control module controls switching of the rectification MOSFET M1.

3. The synchronous rectification circuit according to claim 1,
    wherein the switch PM1 is a P-type MOSFET or a PNP bipolar transistor; the free-wheeling MOSFET NM2 is an N-type MOSFET or an NPN bipolar transistor.

4. The synchronous rectification circuit according to claim 1,
    wherein the rectification MOSFET M1 is a Vertical double-diffusion Metal-oxide-semiconductor (VDMOS) or a Lateral double-diffusion Metal-oxide-semiconductor (LDMOS).

* * * * *